(12) United States Patent
Sugiura et al.

(10) Patent No.: US 11,979,064 B2
(45) Date of Patent: May 7, 2024

(54) MOTOR ROTOR WITH SURFACE TREATMENT

(71) Applicant: IHI Corporation, Tokyo (JP)

(72) Inventors: Hikaru Sugiura, Tokyo (JP); Yuji Sasaki, Tokyo (JP); Tatsumi Inomata, Tokyo (JP); Kai Iijima, Tokyo (JP); Tatsuya Fukui, Tokyo (JP); Yoshihito Katsu, Tokyo (JP); Kuniaki Iizuka, Tokyo (JP); Ryosuke Yumoto, Tokyo (JP)

(*) Notice: Subject to any disclaimer, the term of this patent is extended or adjusted under 35 U.S.C. 154(b) by 312 days.

(21) Appl. No.: 17/493,845

(22) Filed: Oct. 5, 2021

(65) Prior Publication Data

US 2022/0029487 A1   Jan. 27, 2022

Related U.S. Application Data

(63) Continuation of application No. PCT/JP2020/013113, filed on Mar. 24, 2020.

(30) Foreign Application Priority Data

Apr. 10, 2019 (JP) .................................. 2019-074829

(51) Int. Cl.
*H02K 1/30* (2006.01)
*F02B 37/04* (2006.01)
(Continued)

(52) U.S. Cl.
CPC .............. *H02K 1/30* (2013.01); *H02K 1/278* (2013.01); *H02K 15/03* (2013.01); *H02K 15/12* (2013.01); *F02B 37/04* (2013.01); *F02B 39/10* (2013.01)

(58) Field of Classification Search
CPC .......... H02K 1/30; H02K 1/278; H02K 15/03; H02K 15/12; H02K 1/02; H02K 2213/03; H02K 7/14; F02B 37/04; F02B 39/10
See application file for complete search history.

(56) References Cited

U.S. PATENT DOCUMENTS 5,486,730 A * 1/1996 Ludwig .................. H02K 1/278
310/156.28
6,331,214 B1 12/2001 Koga et al.
(Continued)

FOREIGN PATENT DOCUMENTS

CN 101523699 9/2009
CN 101630872 1/2010
(Continued)

OTHER PUBLICATIONS

English translation of JP-2015-211612A (Year: 2015).*
(Continued)

*Primary Examiner* — Tulsidas C Patel
*Assistant Examiner* — Joshua Kiel M Rodriguez
(74) *Attorney, Agent, or Firm* — SOEI PATENT & LAW FIRM

(57) ABSTRACT

An example motor rotor includes a cylindrical magnet which is disposed around a rotation shaft, a protective layer which is disposed around the magnet, and a middle resin portion which is disposed between the magnet and the protective layer. The magnet has a cylindrical shape that extends continuously in a circumferential direction of the rotation shaft. A surface treatment portion is formed on at least one of an outer peripheral surface of the magnet or an inner peripheral surface of the protective layer, to impart adhesion with the middle resin portion.

20 Claims, 9 Drawing Sheets

(51) Int. Cl.
  *F02B 39/10* (2006.01)
  *H02K 1/278* (2022.01)
  *H02K 15/03* (2006.01)
  *H02K 15/12* (2006.01)

(56) References Cited

U.S. PATENT DOCUMENTS

| | | | |
|---|---|---|---|
| 2009/0139079 A1 | 6/2009 | Shibui et al. | |
| 2009/0284093 A1* | 11/2009 | Shiao | H02K 1/278 |
| | | | 29/598 |
| 2010/0295402 A1* | 11/2010 | Miyashita | H02K 1/2753 |
| | | | 310/156.28 |
| 2012/0049661 A1 | 3/2012 | Ions et al. | |
| 2014/0183777 A1 | 7/2014 | Ions et al. | |
| 2017/0201139 A1 | 7/2017 | Yamada et al. | |
| 2019/0207448 A1 | 7/2019 | Ozasa | |
| 2019/0341819 A1 | 11/2019 | Yamada et al. | |
| 2020/0119606 A1* | 4/2020 | Murakami | H02K 15/12 |

FOREIGN PATENT DOCUMENTS

| | | |
|---|---|---|
| CN | 103181062 | 6/2013 |
| CN | 106961173 | 7/2017 |
| CN | 109314421 | 2/2019 |
| DE | 3622231 | 1/1988 |
| EP | 1414136 | 4/2004 |
| JP | S61-108080 | 7/1986 |
| JP | S62-166755 | 7/1987 |
| JP | H6-017379 | 3/1994 |
| JP | 18-107641 | 4/1996 |
| JP | H10-174327 | 6/1998 |
| JP | 2000-014062 | 1/2000 |
| JP | 2002-010545 | 1/2002 |
| JP | 2004-147406 | 5/2004 |
| JP | 2004-260951 | 9/2004 |
| JP | 2005-198447 | 7/2005 |
| JP | 2006115595 A * | 4/2006 |
| JP | 2007-336737 | 12/2007 |
| JP | 2009-095200 | 4/2009 |
| JP | 2014-050126 | 3/2014 |
| JP | 2015-061447 | 3/2015 |
| JP | 2015-211612 | 11/2015 |
| JP | 2016-208724 | 12/2016 |
| WO | 2008/047767 | 4/2008 |
| WO | 2012/025731 | 3/2012 |
| WO | 2018/012153 | 1/2018 |
| WO | WO-2018021104 A1 * | 2/2018 ............. F02B 39/10 |

OTHER PUBLICATIONS

International Preliminary Report on Patentability with Written Opinion dated Oct. 21, 2021 for PCT/JP2020/013113.

International Search Report dated Jun. 23, 2020 for PCT/JP2020/013113.

* cited by examiner

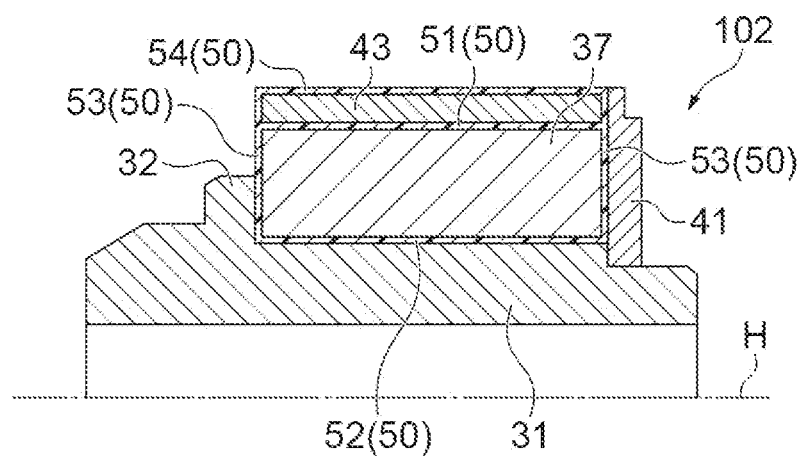
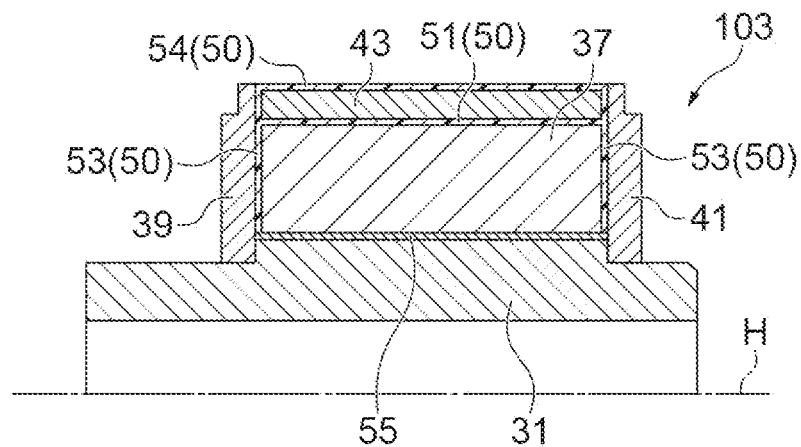
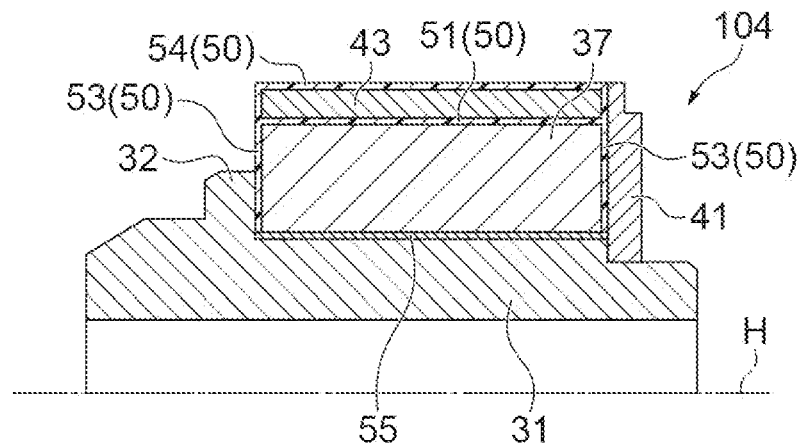

MOTOR ROTOR WITH SURFACE TREATMENT

CROSS-REFERENCE TO RELATED APPLICATIONS

This application is a continuation application of PCT Application No. PCT/JP2020/013113, filed on Mar. 24, 2020, which claims the benefit of priority from Japanese Patent Application No. 2019-074829, filed on Apr. 10, 2019, the entire contents of which are incorporated herein by reference.

BACKGROUND

Japanese Unexamined Patent Publication No. 2016-208724 describes a rotor that includes a cylindrical magnet located on an outer periphery of a shaft and a protective layer located on an outer periphery of the cylindrical magnet. The cylindrical magnet and the protective layer are joined to each other by residual stress.

SUMMARY

An example motor rotor includes a magnet which is disposed around a rotation shaft, a protective layer which is disposed around the magnet, and a middle resin portion disposed between the magnet and the protective layer. The magnet has a cylindrical shape that extends continuously in a circumferential direction of the rotation shaft. A surface treatment portion is formed on at least one of an outer peripheral surface of the magnet or an inner peripheral surface of the protective layer, to impart adhesion with the middle resin portion.

BRIEF DESCRIPTION OF DRAWINGS

FIG. 6A is a cross-sectional view illustrating a motor rotor according to another example.

FIG. 6B is a cross-sectional view illustrating a motor rotor according to another example.

FIG. 6C is a cross-sectional view illustrating a motor rotor according to another example.

DETAILED DESCRIPTION

Figure 1:
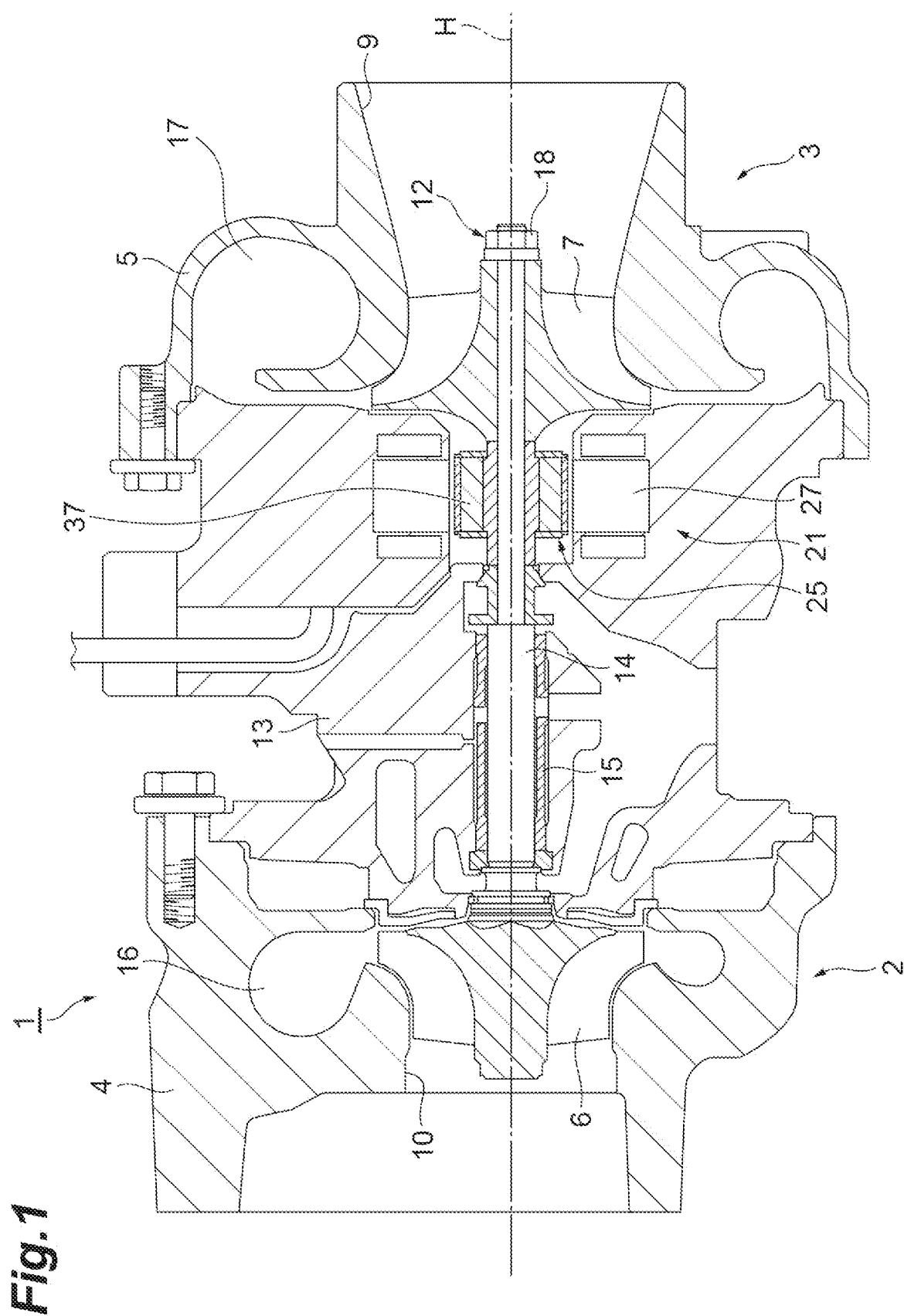
FIG. 1 is a cross-sectional view illustrating an example of a turbocharger with an example motor rotor.

An example motor rotor includes a magnet which is disposed around a rotation shaft, a protective layer which is disposed around the magnet, and a first resin portion (e.g., a middle resin portion) which is inserted to fill a gap between the magnet and the protective layer and is formed of a resin. The magnet has a cylindrical shape that extends continuously in a circumferential direction of the rotation shaft, and a first surface treatment portion is provided in at least one of an outer peripheral surface of the magnet and an inner peripheral surface of the protective layer.

In some examples, a groove extending in a direction including an axial component of the rotation shaft may be provided as the first surface treatment portion.

In some examples, a groove extending in a direction including a circumferential component may be provided as the first surface treatment portion.

In some examples, the first surface treatment portion may be a twill knurled portion having been subjected to twill knurling.

In some examples, the first surface treatment portion may be provided on both the outer peripheral surface of the magnet and the inner peripheral surface of the protective layer.

In some examples, the motor rotor may further include a third resin portion (e.g., an end resin portion) which covers an end surface of the magnet in an axial direction of the rotation shaft and is formed of a resin.

In some examples, the motor rotor may further include a fourth resin portion (or an outer resin portion) which covers an outer peripheral surface of the protective layer and is formed of a resin.

In some examples, a resin covering an outer peripheral surface of the protective layer may not be formed so that the outer peripheral surface of the protective layer is exposed.

In some examples, the motor rotor may further include a third resin portion (e.g., a pair of end resin portions) which covers an end surface of the magnet in an axial direction of the rotation shaft and is formed of a resin, and a fourth resin portion (e.g., an outer resin portion) which covers an outer peripheral surface of the protective layer and is formed of a resin. The protective layer may be made of CFRP, and an entire surface of the protective layer may be covered by the first resin portion, the third resin portion, and the fourth resin portion.

In some examples, the motor rotor may further include an inner sleeve which is interposed between the rotation shaft and the magnet, and a second resin portion (e.g., an inner resin portion) which is filled into a gap between the inner sleeve and the magnet and is formed of a resin. A second surface treatment portion may be provided in at least one of an inner peripheral surface of the magnet and an outer peripheral surface of the inner sleeve.

In some examples, the second surface treatment portion may be a twill knurled portion having been subjected to twill knurling.

In some examples, the motor rotor may further include a third resin portion (e.g., a pair of end resin portions) which covers an end surface of the magnet in an axial direction of the rotation shaft and is formed of a resin. An entire surface of the magnet may be covered by the first resin portion, the second resin portion, and the third resin portion.

In some examples, the motor rotor may further include a third resin portion (e.g., a pair of end resin portions) which covers an end surface of the magnet in an axial direction of the rotation shaft and is formed of a resin, and a fourth resin portion (e.g., an outer resin portion) which covers an outer peripheral surface of the protective layer and is formed of a resin, wherein the inner sleeve, the magnet, and the protective layer may be integrally connected to each other via the first resin portion, the second resin portion, the third resin portion, and the fourth resin portion.

In some examples, the motor rotor may further include an end ring which is disposed along an end surface of the magnet in an axial direction of the rotation shaft, wherein the end ring may abut against a step end surface of a large diameter portion of the inner sleeve.

In some examples, the end ring may have an outer diameter that is equal to that of the magnet, and the protective layer may be disposed to cover the magnet and the end ring.

In some examples, the inner sleeve may have a flange portion which projects in a radial direction, and the magnet may abut against the flange portion.

In some examples, the motor rotor may further include an end ring which is disposed along one end surface of the magnet in an axial direction of the rotation shaft. The inner sleeve may have a flange portion which projects in a radial direction so as to abut against another end surface of the magnet in the axial direction, the end ring may have an outer diameter equal to that of the magnet, and the protective layer may be disposed to include the magnet and the end ring therein.

In some examples, the motor rotor may further include an inner sleeve which is interposed between the rotation shaft and the magnet, and the inner sleeve and the magnet may be adhered by an adhesive.

Another example motor rotor includes a magnet which is disposed around a rotation shaft, a protective layer which is disposed around the magnet, and a first resin portion which is inserted to fill a gap between the magnet and the protective layer and which is formed of a resin. The magnet has a cylindrical shape that extends continuously in a circumferential direction of the rotation shaft, the protective layer has a cylindrical shape that extends continuously in the circumferential direction, and the first resin portion has a cylindrical shape that extends continuously in the circumferential direction in the gap between the magnet and the protective layer.

An example method for manufacturing a motor rotor includes disposing a magnet around an inner sleeve, in which the magnet has a cylindrical shape that extends continuously in a circumferential direction of the inner sleeve, disposing a protective layer which has a cylindrical shape that extends continuously in the circumferential direction around the magnet, injecting a resin by a first insert injection-molding to form a second resin portion (e.g., an inner resin portion) in a gap between the inner sleeve and the magnet and to form a portion of a third resin portion (e.g., an end resin portion) which covers an end surface of the magnet in an axial direction of the inner sleeve, and injecting a resin by a second insert injection-molding to form a first resin portion (e.g., a middle resin portion) in a gap between the magnet and the protective layer, and a remaining portion of the third resin portion (e.g., the end resin portion).

An example motor rotor will be described with reference to the drawings. In the following description, with reference to the drawings, the same reference numbers are assigned to the same components or to similar components having the same function, and overlapping description is omitted. FIG. 1 is a cross-sectional view of a turbocharger 1 including a rotation axis H. The turbocharger 1 is a turbocharger with an example motor rotor. In the following description, the "axial direction", the "radial direction", and the "circumferential direction" refer to the axial direction, the radial direction, and the circumferential direction, respectively of a rotation shaft 14 that will be described further below.

The turbocharger 1 may be operated with an internal combustion engine of a vehicle or the like. As illustrated in FIG. 1, the turbocharger 1 includes a turbine 2 and a compressor 3. The turbine 2 includes a turbine housing 4 and a turbine impeller 6 accommodated in the turbine housing 4. The turbine housing 4 includes a scroll flow passage 16 extending in the circumferential direction around the turbine impeller 6. The compressor 3 includes a compressor housing 5 and a compressor impeller 7 accommodated in the compressor housing 5. The compressor housing 5 includes a scroll flow passage 17 extending in the circumferential direction around the compressor impeller 7.

The turbine impeller 6 is provided at a first end of the rotation shaft 14 and the compressor impeller 7 is provided at a second end of the rotation shaft 14. A bearing housing 13 is provided between the turbine housing 4 and the compressor housing 5. The rotation shaft 14 is rotatably supported by the bearing housing 13 through a bearing 15. The rotation shaft 14, the turbine impeller 6, and the compressor impeller 7 rotate around the rotation axis H as a unitary body 12.

The turbine housing 4 is provided with an exhaust gas inlet and an exhaust gas outlet 10. An exhaust gas discharged from an internal combustion engine flows into the turbine housing 4 through the exhaust gas inlet. Then, the exhaust gas flows into the turbine impeller 6 through the scroll flow passage 16 to rotate the turbine impeller 6. Then, the exhaust gas flows to the outside of the turbine housing 4 through the exhaust gas outlet 10.

The compressor housing 5 is provided with a suction port 9 and a discharge port. When the turbine impeller 6 rotates as described above, the compressor impeller 7 rotates through the rotation shaft 14. The rotating compressor impeller 7 sucks external air through the suction port 9. The air passes through the compressor impeller 7 and the scroll flow passage 17 to be compressed and is discharged from the discharge port. The compressed air discharged from the discharge port is supplied to the above-described internal combustion engine.

The turbocharger 1 includes an electric motor 21. For example, when the torque of the rotation shaft 14 is insufficient at the time of accelerating the vehicle, the electric motor 21 applies a torque to the rotation shaft 14 to compensate for the shortage. The electric motor 21 is, for example, a brushless AC electric motor. The electric motor 21 includes a motor rotor 25 which is a rotor and a motor stator 27 which is a stator. A battery of the vehicle can be used as a drive source of the electric motor 21. The electric motor 21 may regeneratively supply electricity by the rotational energy of the rotation body 12 at the time of decelerating the vehicle. The electric motor 21 has a characteristic corresponding to the high-speed rotation (for example, 100,000 to 200,000 rpm) of the rotation shaft 14.

The motor rotor 25 is disposed between the bearing 15 and the compressor impeller 7 in the axial direction. The motor rotor 25 is fixed to the rotation shaft 14 and is rotatable together with the rotation shaft 14. The motor stator 27 is accommodated in the bearing housing 13 and is disposed to surround the motor rotor 25 in the circumferential direction. The motor stator 27 includes a plurality of coils and iron cores. When a current is supplied to the coil, the motor stator 27 generates a magnetic field. Due to the magnetic field, a circumferential force acts on the permanent magnet 37 of the motor rotor 25. As a result, a torque is applied to the rotation shaft 14.

Figure 2:
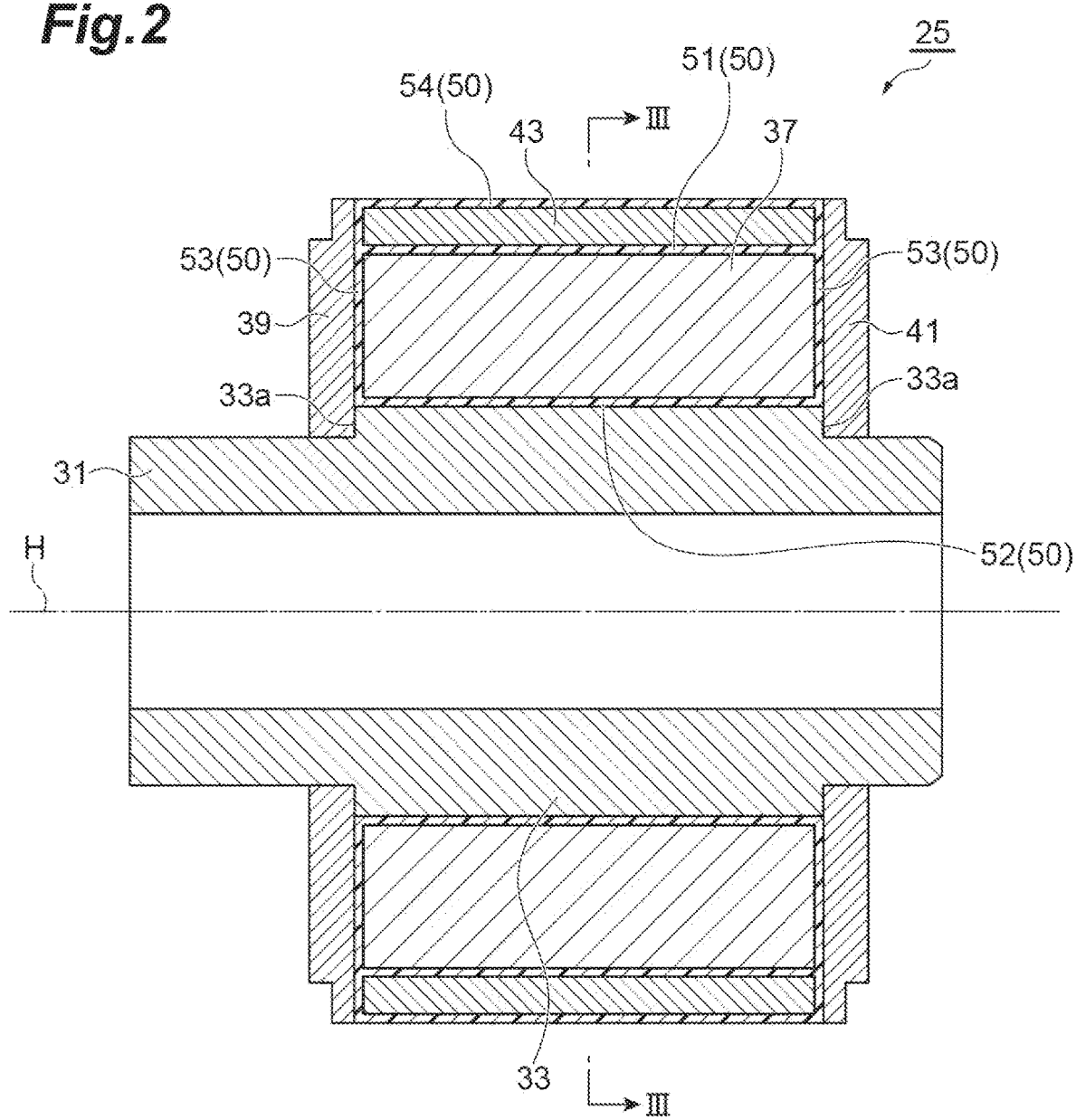
FIG. 2 is a cross-sectional view of the example motor rotor.
Figure 3:
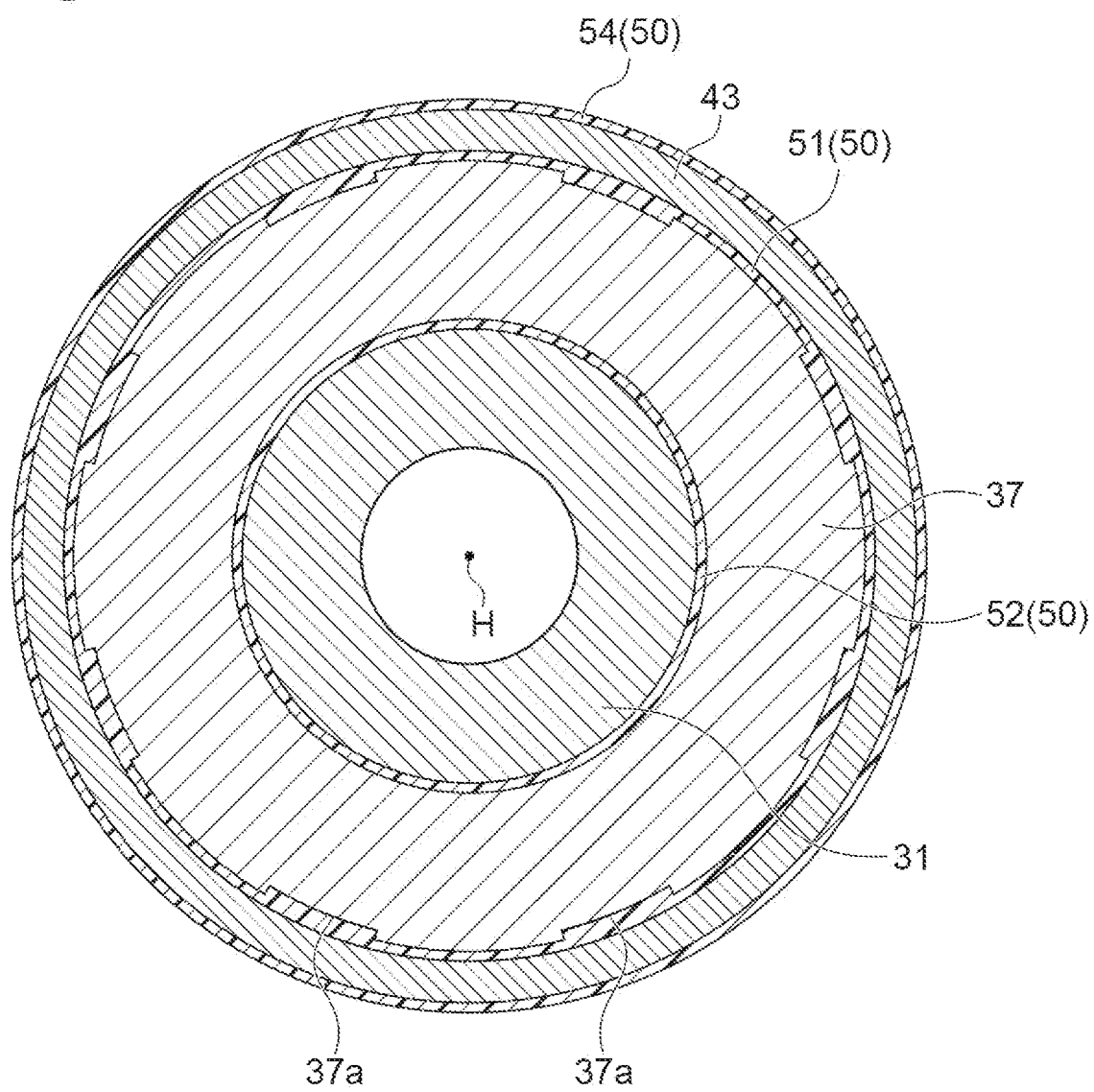
FIG. 3 is a cross-sectional view of the example motor rotor of FIG. 2, taken along line III-III.

The example motor rotor 25 will be described with reference to FIGS. 2 and 3. The motor rotor 25 is an assembly which includes an inner sleeve 31, a permanent magnet 37, end rings 39 and 41, a protective layer 43, and a resin portion 50. The inner sleeve 31, the permanent magnet 37, the end rings 39 and 41, the protective layer 43, and the resin portion 50 are formed as a rotational body having a center axis along the rotation axis H.

The inner sleeve 31 includes a large diameter portion 33 provided with a slightly large diameter at the center portion in the axial direction. The permanent magnet 37 is installed around the large diameter portion 33. The permanent magnet 37 has a cylindrical shape so as to extend continuously in a circumferential direction of the rotation shaft 14. A groove 37a extending in the axial direction is formed on an outer peripheral surface of the permanent magnet 37 at equal intervals in the circumferential direction. The protective layer 43 is a cylindrical member and is sometimes called an "armor ring" or the like. The protective layer 43 is installed around the permanent magnet 37. The protective layer 43 has a cylindrical shape so as to extend continuously in the circumferential direction of the rotation shaft 14. The protective layer 43 prevents debris from scattering in the radial direction when the permanent magnet 37 is damaged. The protective layer 43 has a rigidity in order to suppress the strain of the permanent magnet 37 and reduce the likelihood of damage to the permanent magnet 37. The axial length of the permanent magnet 37, the axial length of the protective layer 43, and the axial length of the large diameter portion 33 are substantially the same. A narrow (or thin) gap is formed between the permanent magnet 37 and the protective layer 43 so that the protective layer 43 does not contact the permanent magnet 37, and the gap is filled with a resin material of the resin portion 50. Similarly, a narrow gap is formed between the inner sleeve 31 and the permanent magnet 37 and the gap is filled with a resin material of the resin portion 50.

The resin portion 50 includes a resin portion 51 (first resin portion or middle resin portion) and a resin portion 52 (second resin portion or inner resin portion). The resin portion 51 is introduced into the gap between the permanent magnet 37 and the protective layer 43, and may form a cylindrical shape that extends continuously in the circumferential direction. The resin portion 52 is introduced into the gap between the inner sleeve 31 and the permanent magnet 37, and may form a cylindrical shape that extends continuously in the circumferential direction. The resin portion 50 includes a resin portion 53 (third resin portion or end resin portion) and a resin portion 54 (fourth resin portion or outer resin portion). The resin portion 53 covers an axial end surface of the permanent magnet 37 and an axial end surface of the protective layer 43. The resin portion 54 covers an outer peripheral surface of the protective layer 43, and may have a cylindrical shape that extends continuously in the circumferential direction. The permanent magnet 37 is covered with the resin portion 50 in order to protect the permanent magnet 37 from an outer environment. The resin portion 50 may be formed by injection-molding.

The inner sleeve 31, the permanent magnet 37, and the protective layer 43 are connected to each other via such a resin portion 50 to form a unitary assembly. Namely, the inner sleeve 31, the permanent magnet 37, and the protective layer 43 are bonded together with the resin portion 51, the resin portion 52, the resin portion 53, and the resin portion 54. The torque can be transmitted between the inner sleeve 31 and the permanent magnet 37 by the resin portion 52. The torque can be transmitted between the permanent magnet 37 and the protective layer 43 by the resin portion 51. The torque transmitted in the turbocharger 1 is, for example, about 0.5 Nm.

The pair of end rings 39 and 41 which are disposed along each end of surfaces of the permanent magnet 37 in an axial direction of the rotation shaft 14. The pair of end rings 39 and 41 form an annular shape having an outer diameter which is substantially equal to a diameter of the protective layer 43. The end rings 39 and 41 are press-inserted along the outer periphery of the inner sleeve 31 at opposite ends of the large diameter portion 33. The end rings 39 and 41 are aligned and abutted against a step end surface 33a of the large diameter portion 33. Namely, the large diameter portion 33 extends along a length of the permanent magnet 37 in the axial direction, and a pair of small diameter portions extend from opposite ends of the large diameter portion so as to form the step end surface 33a adjacent each of the axial end surfaces of the permanent magnet 37. The end rings 39 and 41 are disposed to interpose the permanent magnet 37 and the protective layer 43 between the end rings 39 and 41 in the axial direction and prevent the axial movement of the permanent magnet 37 and the protective layer 43. The above-described resin portion 53 is formed between each of the end rings 39 and 41, and the permanent magnet 37 and the protective layer 43.

As described above, the motor rotor 25 is a unitary assembly.

The rotation shaft 14 is inserted through the hollow portion of the inner sleeve 31 of the motor rotor 25. Then, the motor rotor 25 is fastened to the rotation shaft 14 together with the compressor impeller 7 by a nut 18 (cf. FIG. 1).

As the material of the inner sleeve 31, a steel material such as SCM435H can be adopted, for example. As the material of the permanent magnet 37, a neodymium magnet (Nd—Fe—B), a samarium cobalt magnet, or the like can be adopted, for example. As the material of the protective layer 43, a metal material or a resin material can be adopted. As the metal material of the protective layer 43, a non-magnetic metal such as titanium alloy (for example, Ti-6Al-4V) can be adopted. As the resin material of the protective layer 43, carbon fiber reinforced plastic (CFRP) etc. can be adopted. As the materials of the end rings 39 and 41, for example, a non-magnetic metal such as SUS, a thermosetting resin, a thermoplastic resin, or the like can be adopted.

As the material of the resin portion 50, a thermosetting resin, a thermoplastic resin, or the like can be adopted. For example, phenol resin or epoxy resin which is a thermosetting resin or liquid crystal polymer (LCP) which is a thermoplastic resin can be adopted as the material of the resin portion 50. According to tests conducted, LCP has higher fluidity during injection-molding than phenol resin. LCP is relatively easily obtained as compared with phenol resin. On the other hand, the phenol resin is superior in heat resistance, rigidity, and environmental resistance as compared with LCP. The epoxy resin itself has adhesiveness.

Figure 4A:
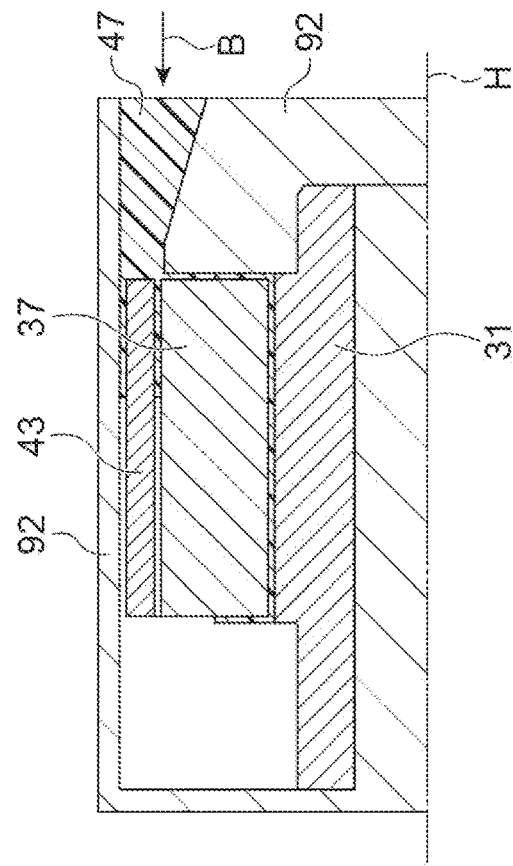
FIG. 4A is a cross-sectional view illustrating a manufacturing step in an example method of manufacturing a motor rotor.

An example of a method of manufacturing the motor rotor 25 will be described. The resin portion 50 is formed by a two-stage insert injection-molding as will be described further below. As illustrated in FIG. 4A, the permanent magnet 37 is fitted on the outer periphery of the inner sleeve 31 by gap-fitting and the inner sleeve 31 and the permanent magnet 37 are set in the mold 91. Then, as indicated by an arrow A, a resin material 47 is injected into the mold 91 in the axial direction to mold (or form) a part of the resin portion 52 and the resin portion 53.

Figure 4B:
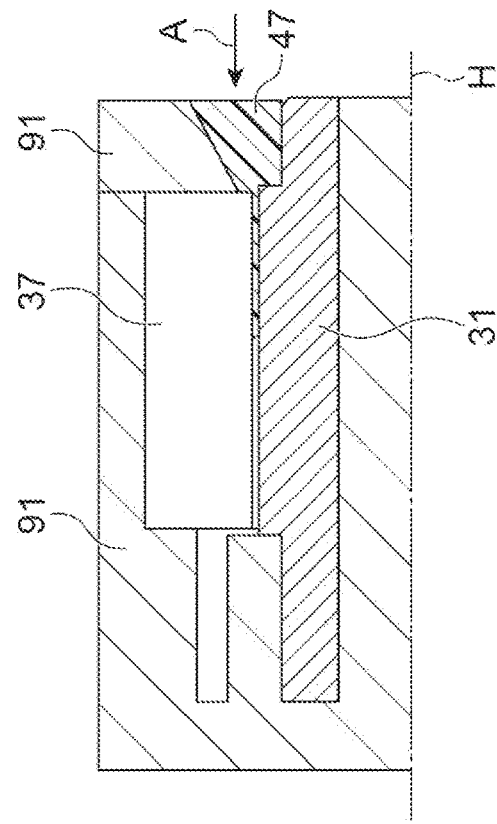
FIG. 4B is a cross-sectional view illustrating another manufacturing step of the example method.

Then, as illustrated in FIG. 4B, further, the protective layer 43 is fitted on the outer periphery of the permanent magnet 37 by gap-fitting and is set in another mold 92. Then, as indicated by an arrow B, the resin material 47 is injected into the mold 92 in the axial direction to mold (or form) a remaining part of the resin portions 51 and 54 and the resin portion 53. The above-described parts are removed from the mold 92 and the end rings 39 and 41 are respectively press-inserted from opposite ends of the inner sleeve 31. Then, the rotation balance is adjusted by cutting a part of the end rings 39 and 41 to complete the motor rotor 25. The method of fixing the end rings 39 and 41 to the inner sleeve 31 is not limited to the above-described press-inserting. For example, the end rings 39 and 41 and the inner sleeve 31 may be fixed by causing a part of the resin portion 50 to enter between the end rings 39 and 41 and the inner sleeve 31.

In the motor rotor 25, the protective layer 43 is fixed to the permanent magnet 37 through the resin portion 51. Thus, it is not necessary to use a method of shrink-fitting the protective layer 43 to the permanent magnet 37 at the time of manufacturing the motor rotor 25.

As a comparative example, when the protective layer 43 formed of titanium is shrink-fitted, work such as heating to about 450° C. may be required such that stricter work safety management may be required. Further, when the protective layer 43 is shrink-fitted, it may be necessary to control the dimensions and surface roughness of the protective layer 43 and the permanent magnet 37 with high accuracy. For these reasons, it is difficult to improve productivity. On the other hand, according to the motor rotor 25, the protective layer 43 and the permanent magnet 37 are joined to each other via the resin portion 51 filled in the gap therebetween, so that the required accuracy of the dimensions and surface roughness of the protective layer 43 and the permanent magnet 37 may be lowered. The method does not require to perform a treatment of heating parts at a high temperature as in the shrink-fitting, so as to reduce the safety management requirements during manufacturing. As a result, the productivity of the motor rotor 25 is improved. Additionally, a relatively simple method such as injection-molding is used, so that the workability is increased as compared to the shrink-fitting or the like, thereby increasing the productivity of the motor rotor 25.

According to the above-described fixing structure of the protective layer 43 using the resin portion 51, the range of material selection for the protective layer 43 is increased as compared to the structure in which the protective layer 43 is shrink-fitted. As the material of the protective layer 43, a resin material such as CFRP can be adopted, for example.

When a resin material is adopted as the material of the protective layer 43, the affinity between the protective layer 43 and the resin portion 50 is increased. The protective layer 43 and the permanent magnet 37 are firmly bonded to each other. The weight of the protective layer 43 is reduced as compared with the metal material, when the resin material is adopted as the material of the protective layer 43, so that the inertia of the motor rotor 25 is reduced. Additionally, the controllability of the electric motor 21 is improved. For example, since CFRP has higher strength than titanium alloy (for example, Ti-6Al-4V), the CFRP protective layer 43 can be thinned. The inertia is reduced by thinning and reducing the density of the protective layer 43. The diameter of the permanent magnet 37 can be increased by the amount of the thinning of the protective layer 43. The performance of the electric motor 21 can be improved as a result of increasing the diameter of the permanent magnet 37.

When CFRP is adopted as the material of the protective layer 43, there may be a concern that the mechanical properties of the CFRP may deteriorate due to water absorption. However, the protective layer 43 is covered with the resin portion 50, namely an entire surface of the protective layer 43 is covered by the resin portion 51, the resin portion 53, and the resin portion 54, so as to better maintain the mechanical properties of the protective layer 43. Additionally, the permanent magnet 37 is covered with the resin portion 50, namely an entire surface of the permanent magnet 37 is covered by the resin portion 51, the resin portion 52, and the resin portion 53, so as to inhibit oxidation of the permanent magnet 37.

The groove 37a (first surface treatment portion) is provided in at least one of an outer peripheral surface of the permanent magnet 37 and an inner peripheral surface of the protective layer 43. Since the groove 37a (cf. FIG. 3) is formed on the outer peripheral surface of the permanent magnet 37, the resin portion 51 is molded in a shape that is fitted into the groove 37a. The permanent magnet 37 and the resin portion 51 are in close contact with each other in the circumferential direction. As a result, the groove 37a functions as a detent between the resin portion 51 and the permanent magnet 37. Accordingly, the groove 37a functions as a torque transmission key between the permanent magnet 37 and the protective layer 43, so as to achieve a suitable torque transmission from the permanent magnet 37 to the protective layer 43. In this way, the groove 37a is a surface treatment portion provided in the outer peripheral surface of the permanent magnet 37 in order to impart a suitable adhesiveness between the permanent magnet 37 and the resin portion 51. At the time of injection-molding the resin portion 50, the groove 37a is used as a guide. The resin material is likely to flow in the gap between the permanent magnet 37 and the protective layer 43 in the axial direction, so as to suitably fill the gap.

It is to be understood that not all aspects, advantages and features described herein may necessarily be achieved by, or included in, any one particular example. Indeed, having described and illustrated various examples herein, it should be apparent that other examples may be modified in arrangement and detail. For example, the motor rotor can be implemented in various forms including the above-described examples. A modified example may also be configured by incorporating any suitable feature of the above-described examples. The configurations of the respective examples may be combined and used as appropriate.

For example, the surface treatment portion for providing the adhesiveness between the permanent magnet 37 and the resin portion 51 is not limited to the groove 37a. That is, as an example of the groove 37a, the outer peripheral surface of the permanent magnet 37 may be provided with a groove extending in a direction including an axial component. Such a groove imparts an adhesiveness between the permanent magnet 37 and the resin portion 51, in the circumferential direction, so as to suppress the misalignment of the protective layer 43 with respect to the permanent magnet 37 in the circumferential direction. Accordingly, the groove functions as a torque transmission key between the permanent magnet 37 and the protective layer 43.

Figure 5A:
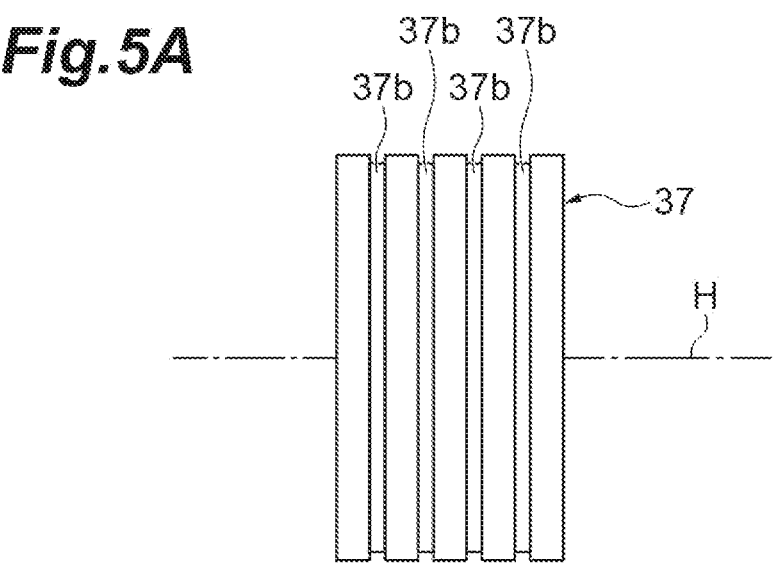
FIG. 5A is a side view of an example magnet of a motor rotor, illustrating an example of a surface treatment portion on an outer peripheral surface of the example magnet.

The outer peripheral surface of the permanent magnet 37 may be provided with a groove extending in a direction including a circumferential component. Such a groove imparts an adhesiveness between the permanent magnet 37 and the resin portion 51 in the axial direction, so as to suppress the misalignment of the protective layer 43 with respect to the permanent magnet 37 in the axial direction. In such an example, as illustrated in FIG. 5A, a groove 37b extending in the circumferential direction may be provided in the outer peripheral surface of the permanent magnet 37. FIG. 5A illustrates a side view of the permanent magnet 37.

In some examples, both the groove extending in the direction including the axial component and the groove extending in the direction including the circumferential component may be provided in the outer peripheral surface of the permanent magnet 37. A groove extending in the direction including the axial component and the circumferential component may be provided in the outer peripheral surface of the permanent magnet 37. In some examples, the outer peripheral surface of the permanent magnet 37 may be subjected to twill knurling to provide a twill knurled portion. As another example, a spiral groove extending with the rotation axis H as a center axis may be provided in the outer peripheral surface of the permanent magnet 37.

As the surface treatment portion for obtaining the adhesiveness between the permanent magnet 37 and the resin portion 51, an uneven processing portion other than the groove may be provided in the outer peripheral surface of the permanent magnet 37. As another example, the surface treatment portion may be a rough surface formed by roughening the outer peripheral surface of the permanent magnet 37. The above-described roughening treatment may be a chemical roughening treatment or a physical roughening treatment. As still another example, a coupling agent may be applied as a primer to the outer peripheral surface of the permanent magnet 37. The coupling agent may be added on to the outer peripheral surface of the permanent magnet 37 by immersing the permanent magnet in the coupling agent as described above.

Various surface treatments described above may be adopted in combination.

Figure 5B:
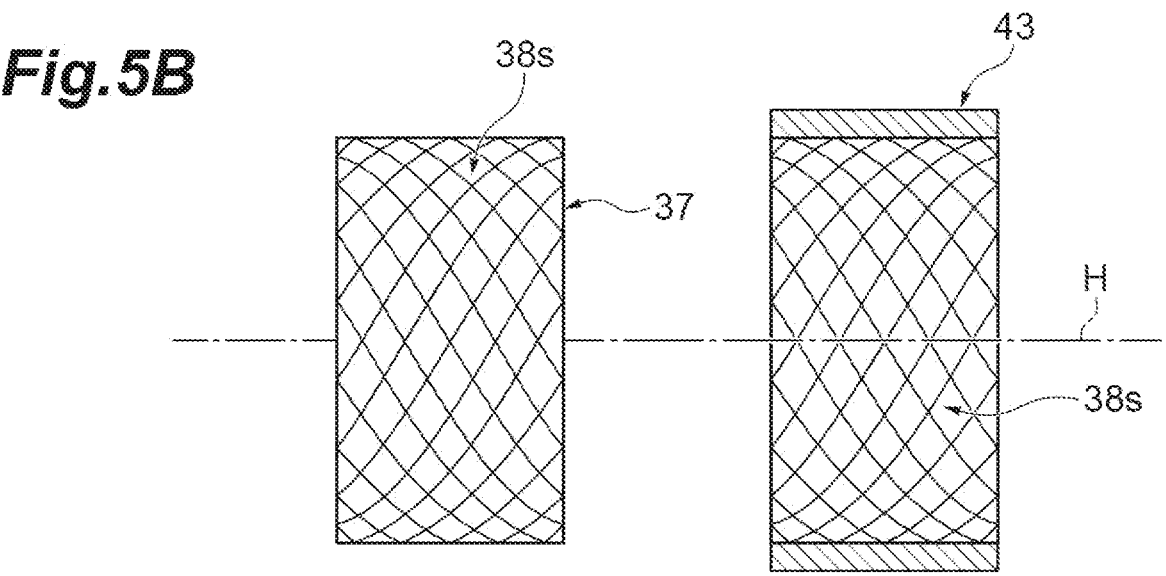
FIG. 5B is a side view of an example magnet and a cross-sectional view of an example protective layer of a motor rotor, illustrating another example of surface treatment portions.

The first surface treatment portion may be provided in the inner peripheral surface of the protective layer 43. The first surface treatment portion may be provided on both the outer peripheral surface of the permanent magnet 37 and the inner peripheral surface of the protective layer 43, in order to obtain the adhesiveness between the protective layer 43 and the resin portion 51. For example, the inner peripheral surface of the protective layer 43 may be provided with the above-described twill knurled portion. The first surface treatment portion may be provided on both the outer peripheral surface of the permanent magnet 37 and the inner peripheral surface of the protective layer 43. For example, as illustrated in FIG. 5B, both the outer peripheral surface of the permanent magnet 37 and the inner peripheral surface of the protective layer 43 may be provided with the above-described twill knurled portion 38s. FIG. 5B illustrates a side view of the permanent magnet 37 and a cross-sectional view of the protective layer 43, in which the permanent magnet 37 and the protective layer 43 are positioned side by side along the rotation axis H (e.g., in a disassembled configuration). The first surface treatment portion may promote a better alignment of the protective layer 43 with the permanent magnet 37.

Figure 5C:
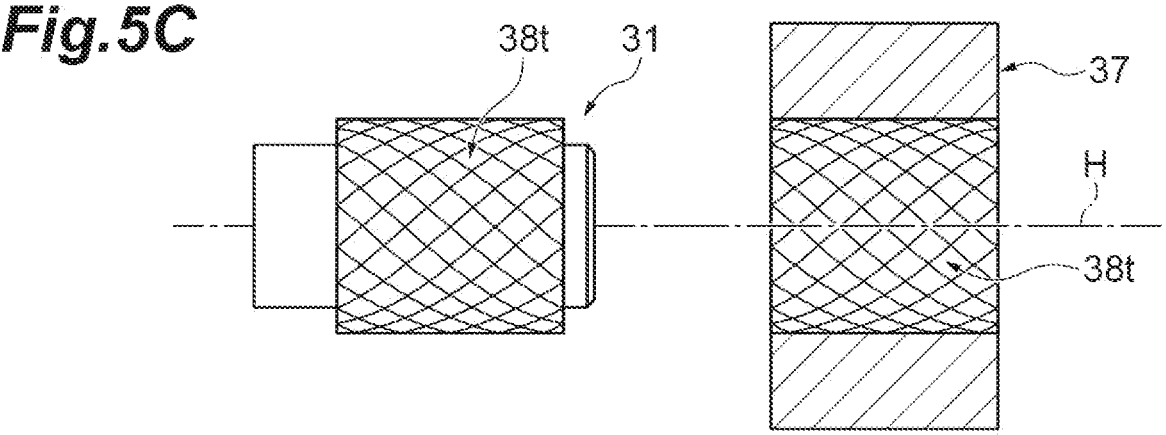
FIG. 5C is a side view of an example magnet mounted on an inner sleeve and a cross-sectional view of an example protective layer of a motor rotor, illustrating another example of surface treatment portions.

The above-described surface treatment portion may be provided in the inner peripheral surface of the permanent magnet 37 as a second surface treatment portion, to obtain the adhesiveness between the permanent magnet 37 and the resin portion 52. The second surface treatment portion may be provided in the outer peripheral surface of the inner sleeve 31 to obtain the adhesiveness between the inner sleeve 31 and the resin portion 52. The second surface treatment portion may be provided in both the inner peripheral surface of the permanent magnet 37 and the outer peripheral surface of the inner sleeve 31. The second surface treatment portion may be provided in at least one of an inner peripheral surface of the permanent magnet 37 and an outer peripheral surface of the inner sleeve 31. In such examples, as illustrated in FIG. 5C, a twill knurled portion 38t may be provided in both the inner peripheral surface of the permanent magnet 37 and the outer peripheral surface of the inner sleeve 31. FIG. 5C illustrates a side view of the inner sleeve 31 and a cross-sectional view of the permanent magnet 37, in which the inner sleeve 31 and the permanent magnet 37 are positioned side by side along the rotation axis H (e.g., in a disassembled configuration). The second surface treatment portion may promote a better alignment of the permanent magnet 37 with the inner sleeve 31.

In some examples, the resin portion 53 covering an axial end surface of the permanent magnet 37 achieves the function of the end rings 39 and 41, such that the end rings 39 and 41 may be omitted. The resin portion 52 may be omitted, the permanent magnet 37 and the inner sleeve 31 may be simply gap-fitted to each other. The permanent magnet 37 and the inner sleeve 31 may be temporarily fixed with an adhesive or the like. In such a case, the torque of the permanent magnet 37 may be transmitted to the inner sleeve 31 through the resin portion 51, the protective layer 43, and the end rings 39 and 41.

In some examples, the motor rotor 25 is replaced, for example, with one of motor rotors 102-104 of FIGS. 6A-6C, motor rotors 111-114 of FIGS. 7A-7D, motor rotors 121-124 of FIGS. 8A-8D, and motor rotors 131-134 of FIGS. 9A-9D. In the following description, the example motor rotors will be described with reference to differences from the motor rotor 25, and accordingly, the same or equivalent components will be assigned the same reference numerals, and redundant description thereon may be omitted.

In the inner sleeve 31 of the motor rotor 102 illustrated in FIG. 6A, a flange portion 32 which projects in the radial direction is provided adjacent an end of the permanent magnet 37 that is to face a turbine (e.g., turbine 2 in FIG. 1). The motor rotor 102 does not include the end ring 39 (cf. FIG. 2) on the side of the turbine. The permanent magnet 37 extends in the axial direction and abuts against the flange portion 32. The axial movement of the permanent magnet 37 is prevented by the end ring 41 and the flange portion 32 located at the end of the permanent magnet 37 that is to face a compressor (e.g., compressor 3 in FIG. 1). In the motor rotor 103 illustrated in FIG. 6B, the permanent magnet 37 is gap-fitted to the inner sleeve 31 and joined with an adhesive. Instead of the resin portion 52 (cf. FIG. 2), an adhesive layer 55 is formed in the gap between the permanent magnet 37 and the inner sleeve 31. As the adhesive, an anaerobic adhesive can be adopted, for example. As an example anaerobic adhesive, Loctite 325 (registered trademark, manufactured by Henkel Japan Ltd.) can be adopted, together with an adhesive activator such as Loctite 7071 (registered trademark, manufactured by Henkel Japan Ltd.) that may be added thereto. The motor rotor 104 illustrated in FIG. 6C combines features of the above-described motor rotor 102 and of the above-described motor rotor 103.

Figure 7A:
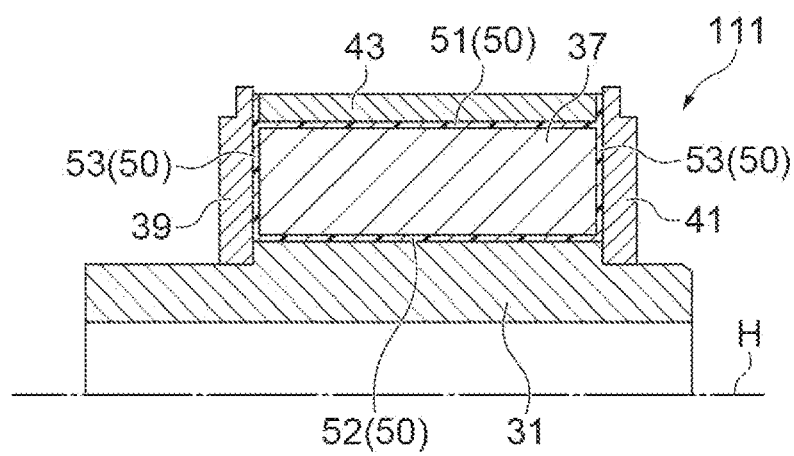
FIG. 7A is a cross-sectional view illustrating a motor rotor according to another example.
Figure 7B:
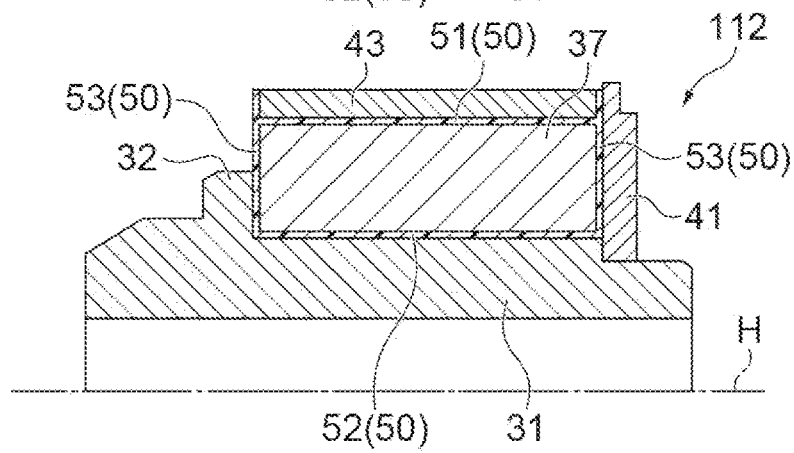
FIG. 7B is a cross-sectional view illustrating a motor rotor according to another example.
Figure 7C:
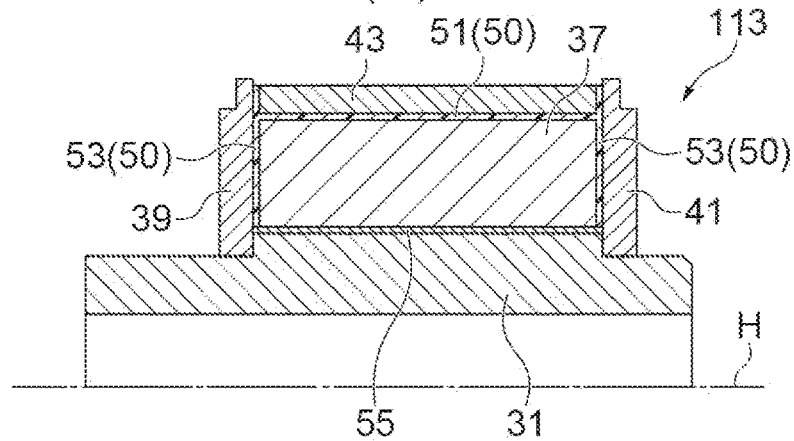
FIG. 7C is a cross-sectional view illustrating a motor rotor according to another example.
Figure 7D:
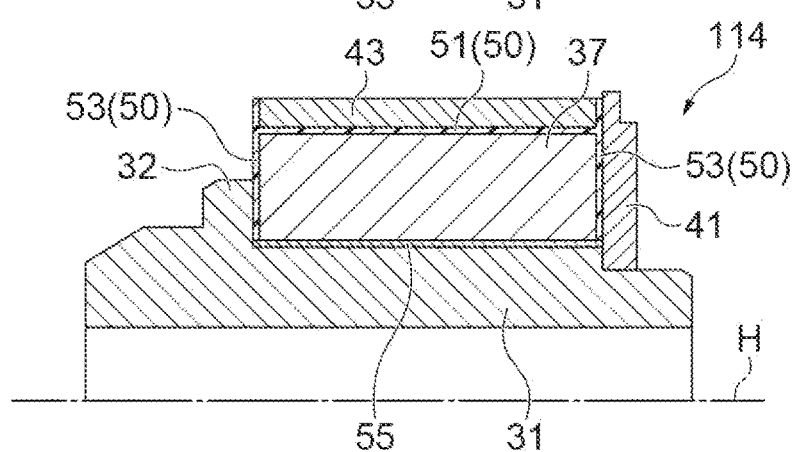
FIG. 7D is a cross-sectional view illustrating a motor rotor according to another example.

With reference to FIG. 7A, instead of covering the protective layer 43 with the resin portion 54 (cf. FIG. 2), the outer peripheral surface of the protective layer 43 is exposed in the motor rotor 111. The motor rotor 112 illustrated in FIG. 7B includes features of the motor rotor 111 (FIG. 7A) and of the motor rotor 102 (FIG. 6A). The motor rotor 113 illustrated in FIG. 7C includes features of the motor rotor 111 (FIG. 7A) and of the motor rotor 103 (FIG. 6B). The motor rotor 114 illustrated in FIG. 7D includes features of the motor rotor 111 (FIG. 7A) and of the motor rotor 104 (FIG. 6C).

Figure 8A:
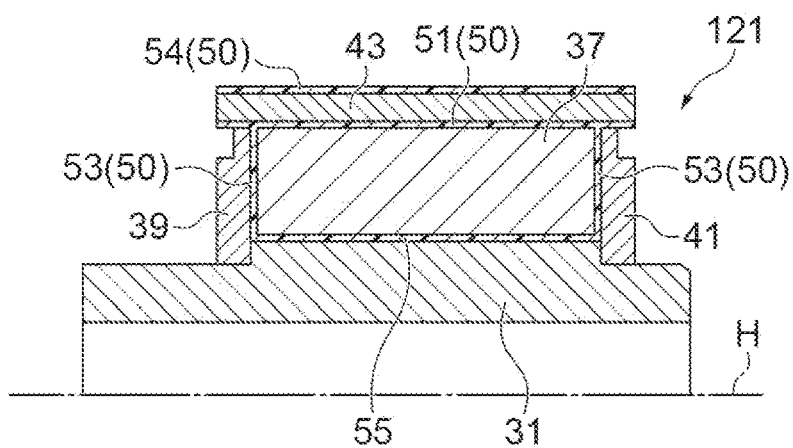
FIG. 8A is a cross-sectional view illustrating a motor rotor according to another example.
Figure 8B:
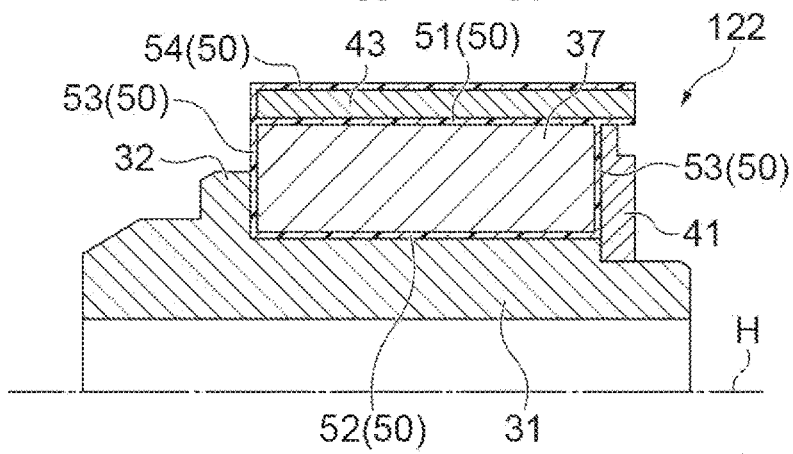
FIG. 8B is a cross-sectional view illustrating a motor rotor according to another example.
Figure 8C:
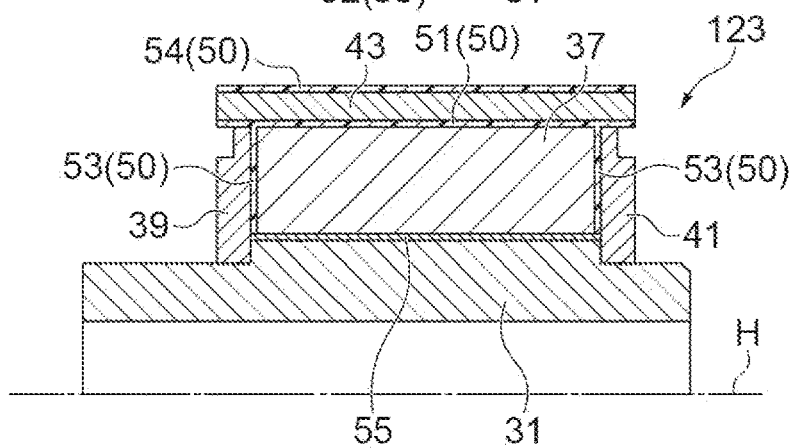
FIG. 8C is a cross-sectional view illustrating a motor rotor according to another example.
Figure 8D:
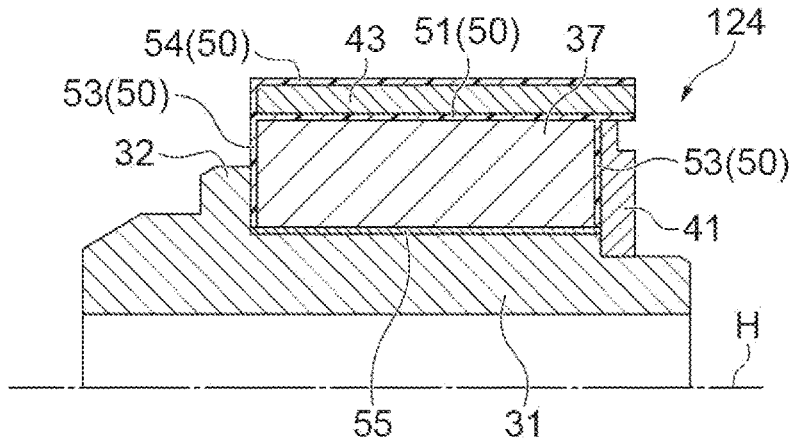
FIG. 8D is a cross-sectional view illustrating a motor rotor according to another example.

In the motor rotor 121 illustrated in FIG. 8A, the end rings 39 and 41 have outer diameters that are substantially equal to the outer diameter of the permanent magnet 37. The protective layer 43 is disposed to cover the permanent magnet 37 and the end rings 39 and 41. The motor rotor 122 illustrated in FIG. 8B includes features of the motor rotor 121 (FIG. 8A) and of the motor rotor 102 (FIG. 6A). The motor rotor 123 illustrated in FIG. 8C includes features of the motor rotor 121 (FIG. 8A) and of the motor rotor 103 (FIG. 6B). The motor rotor 124 illustrated in FIG. 8D includes features of the motor rotor 121 (FIG. 8A) and of the motor rotor 104 (FIG. 6C).

Figure 9A:
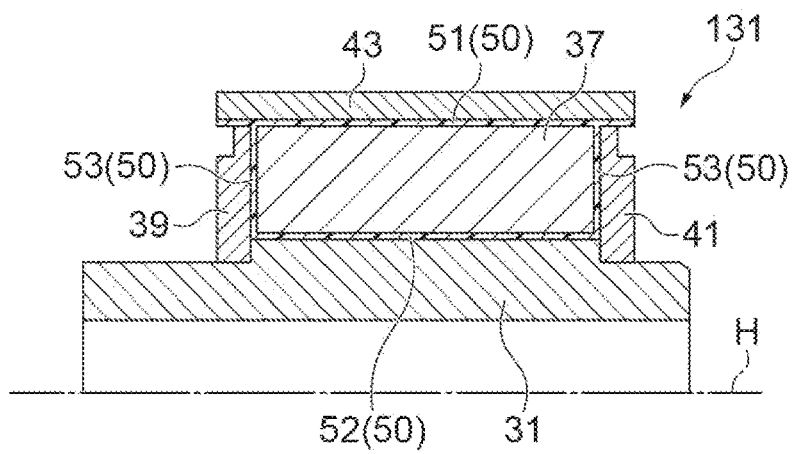
FIG. 9A is a cross-sectional view illustrating a motor rotor according to another example.
Figure 9B:
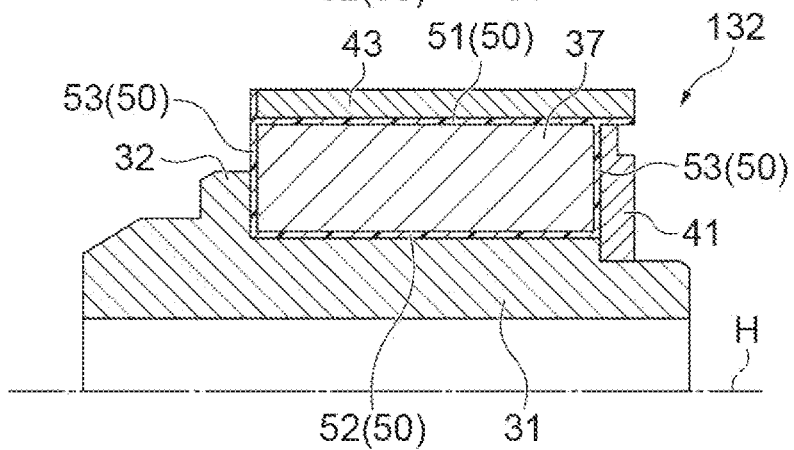
FIG. 9B is a cross-sectional view illustrating a motor rotor according to another example.
Figure 9C:
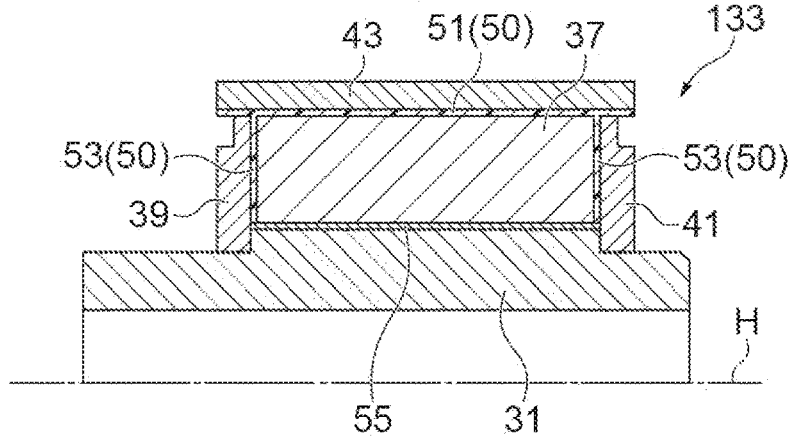
FIG. 9C is a cross-sectional view illustrating a motor rotor according to another example.
Figure 9D:
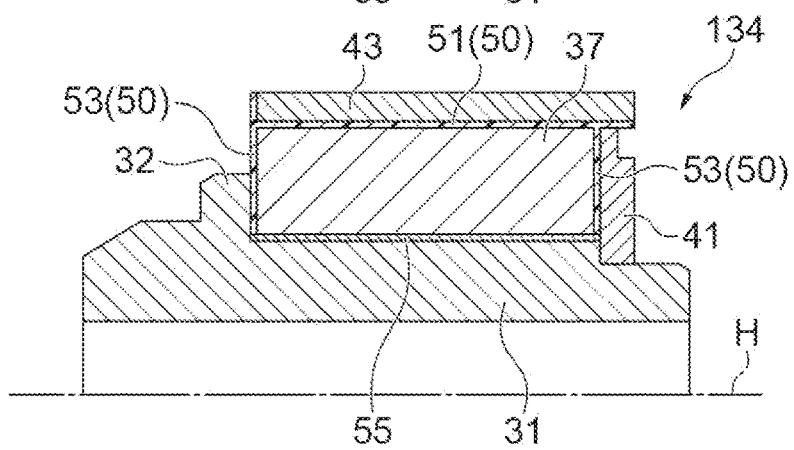
FIG. 9D is a cross-sectional view illustrating a motor rotor according to another example.

The motor rotor 131 illustrated in FIG. 9A includes features of the motor rotor 121 (FIG. 8A) and of the motor rotor 111 (FIG. 7A). The motor rotor 132 illustrated in FIG. 9B includes features of the motor rotor 131 (FIG. 9A) and of the motor rotor 102 (FIG. 6A). The motor rotor 133 illustrated in FIG. 9C includes features of the motor rotor 131 (FIG. 9A) and of the motor rotor 103 (FIG. 6B). The motor rotor 134 illustrated in FIG. 9D includes features of the motor rotor 131 and of the motor rotor 104 (FIG. 6C).

In the motor rotors 121 to 124 (FIGS. 8A-8D) and the motor rotors 131 to 134 (FIGS. 9A-9D), the end rings 39 and 41 are covered by the protective layer 43 and are therefore less accessible to be cut into for adjusting the rotational or dynamic balance of the motor rotor. Instead, the dynamic balance of the motor rotor may be adjusted by cutting or removing a part of the protective layer 43.

Additionally, although examples have been described in which the motor rotors 25, 102-104, 111-114, 121-124 and 131-134 are used in the electric motor 21 of the turbocharger 1 (FIG. 1), any one of the motor rotors 25, 102-104, 111-114, 121-124 and 131-134 may be used in an electric compressor, for example.

The invention claimed is:

1. A motor rotor comprising:
   a magnetic cylinder that is disposed around a rotation shaft, wherein the magnetic cylinder has an outer circumferential surface that extends continuously in a circumferential direction of the rotation shaft;
   a protective layer that is disposed around the magnetic cylinder; and
   a middle resin portion disposed between the magnetic cylinder and the protective layer,
   wherein a surface treatment portion is formed on the outer circumferential surface of the magnetic cylinder to impart adhesion of the outer circumferential surface with the middle resin portion,
   wherein the surface treatment portion includes a groove formed in the outer circumferential surface, and
   wherein the groove extends in a longitudinal direction, the longitudinal direction of the groove having a component in the circumferential direction.

2. The motor rotor according to claim 1, wherein the groove extends in both the circumferential direction and an axial direction of the rotation shaft in a spiral shape along the outer circumferential surface of the magnetic cylinder.

3. The motor rotor according to claim 1, wherein the surface treatment portion includes a plurality of grooves including the groove, and wherein the plurality of grooves form a twill knurled portion formed by twill knurling.

4. The motor rotor according to claim 1, wherein an additional surface treatment portion is provided on an inner circumferential surface of the protective layer.

5. The motor rotor according to claim 1, further comprising an end resin portion that covers an end surface of the magnetic cylinder in an axial direction of the rotation shaft.

6. The motor rotor according to claim 1, further comprising an outer resin portion that covers an outer circumferential surface of the protective layer.

7. The motor rotor according to claim 1, wherein an outer circumferential surface of the protective layer is free of any resin covering so as to be exposed.

8. The motor rotor according to claim 1, further comprising:
   a pair of end resin portions disposed at opposite end surfaces of the magnetic cylinder in an axial direction of the rotation shaft, wherein the end resin portions extend radially to cover opposite ends of the protective layer; and
   an outer resin portion that covers an outer circumferential surface of the protective layer so that the middle resin portion, the end resin portions, and the outer resin portion cover an entire surface of the protective layer,
   wherein the protective layer is made of a carbon fiber reinforced plastic (CFRP).

9. The motor rotor according to claim 1, further comprising:
   an inner sleeve which is interposed between the rotation shaft and the magnetic cylinder; and
   an inner resin portion that is disposed between the inner sleeve and the magnetic cylinder,
   wherein an additional surface treatment portion is provided on at least one of an inner circumferential surface of the magnetic cylinder or an outer circumferential surface of the inner sleeve, to impart adhesion with the inner resin portion, and
   wherein the additional surface treatment portion includes a twill knurled portion formed by twill knurling.

10. The motor rotor according to claim 9, further comprising:
    a pair of end resin portions disposed at opposite end surfaces of the magnetic cylinder in an axial direction of the rotation shaft; and an outer resin portion that covers an outer circumferential surface of the protective layer,
wherein the inner sleeve, the magnetic cylinder, and the protective layer are bonded together via the inner resin portion, the middle resin portion, the outer resin portion, and the pair of end resin portions to form a unitary assembly.

11. The motor rotor according to claim 9, further comprising an end ring which is disposed along an end surface of the magnetic cylinder in an axial direction of the rotation shaft,
wherein the inner sleeve includes a large diameter portion that extends along a length of the magnetic cylinder in the axial direction, so as to form a step end surface adjacent the end surface of the magnetic cylinder,
wherein the end ring abuts against the step end surface of the large diameter portion of the inner sleeve,
wherein a diameter of the end ring is equal to a diameter of the magnetic cylinder, and
wherein the protective layer is disposed to cover the magnetic cylinder and the end ring in the axial direction.

12. The motor rotor according to claim 9, further comprising an end ring which is disposed adjacent a first end surface of the magnetic cylinder in an axial direction of the rotation shaft,
wherein the inner sleeve has a flange portion which projects in a radial direction adjacent a second end surface opposite the first end surface of the magnetic cylinder in the axial direction, to position the magnetic cylinder between end ring and the flange portion of the inner sleeve,
wherein the end ring has a diameter that is equal to a diameter of the magnetic cylinder, and
wherein the protective layer is disposed to cover the magnetic cylinder and the end ring in the axial direction.

13. The motor rotor according to claim 1, further comprising:
an inner sleeve which is interposed between the rotation shaft and the magnetic cylinder; and
an inner resin portion that bonds the inner sleeve with the magnetic cylinder,
wherein an additional surface treatment portion is formed on at least one of an inner circumferential surface of the magnetic cylinder or an outer circumferential surface of the inner sleeve, to impart adhesion with the inner resin portion.

14. The motor rotor according to claim 1, wherein a depth of the groove taken in a radial direction of the magnetic cylinder from the outer circumferential surface is less than a thickness of the magnetic cylinder in the radial direction.

15. The motor rotor according to claim 1,
wherein the groove is recessed from an outermost surface of the outer circumferential surface of the magnetic cylinder, and
wherein in a transverse cross-section taken orthogonally to the longitudinal direction of the groove, the groove is formed along a continuous surface that extends from a first end intersecting the outermost surface to a second end intersecting the outermost surface.

16. The motor rotor according to claim 1, wherein the groove surrounds the magnetic cylinder in the circumferential direction when viewed in an axial direction of the rotation shaft.

17. A motor rotor comprising:
a magnetic cylinder that is disposed around a rotation shaft, wherein the magnetic cylinder has an outer circumferential surface that extends continuously in a circumferential direction of the rotation shaft;
a protective layer that is disposed around the magnetic cylinder; and
a middle resin portion located between the magnetic cylinder and the protective layer,
wherein at least one groove is formed on a treated surface selected from an outer circumferential surface of the magnetic cylinder or an inner circumferential surface of the protective layer, to impart adhesion of the treated surface with the middle resin portion, and
wherein the at least one groove extends along the treated surface in a longitudinal direction, the longitudinal direction of the groove having a component in the circumferential direction.

18. The motor rotor according to claim 17, wherein the groove surrounds the magnetic cylinder in the circumferential direction when viewed in an axial direction of the rotation shaft.

19. A method for manufacturing a motor rotor comprising:
forming a surface treatment portion on an outer circumferential surface of a magnetic cylinder, wherein the outer circumferential surface extends continuously in a circumferential direction of the magnetic cylinder, and wherein the surface treatment portion includes a groove extending along the outer circumferential surface in a longitudinal direction, the longitudinal direction of the groove having a component in the circumferential direction;
disposing a cylindrical protective layer around the magnetic cylinder to form a gap between the protective layer and the magnetic cylinder; and
injecting a resin by an insert injection-molding into the gap, to form a middle resin portion between the protective layer and the magnetic cylinder.

20. The method according to claim 19, further comprising:
forming an additional surface treatment portion on at least one of an inner circumferential surface of the magnetic cylinder or an outer circumferential surface of an inner sleeve;
disposing the inner sleeve inside the magnetic cylinder; and
injecting a resin by a first insert injection-molding into a gap formed between the inner sleeve and the magnetic cylinder, to form an inner resin portion, and to partially form an end resin portion to cover an end surface of the magnetic cylinder in an axial direction of the rotation shaft,
wherein the insert injection-molding to form the middle resin portion is a second insert injection-molding performed after the first insert injection-molding to form a remaining part of the end resin portion.

* * * * *